United States Patent
Yoshikawa

[11] Patent Number: 5,328,127
[45] Date of Patent: Jul. 12, 1994

[54] SPINNING REEL HAVING A SEALED FRONT DRAG MECHANISM

[75] Inventor: Osamu Yoshikawa, Sakai, Japan

[73] Assignee: Shimano Inc., Osaka, Japan

[21] Appl. No.: 107,177

[22] Filed: Aug. 17, 1993

Related U.S. Application Data

[63] Continuation of Ser. No. 726,795, Jul. 8, 1991, abandoned.

[30] Foreign Application Priority Data

Jul. 19, 1990 [JP] Japan .................. 2-77365[U]

[51] Int. Cl.$^5$ .................................. A01K 89/027
[52] U.S. Cl. ................................ 242/246; 242/319
[58] Field of Search .......... 242/246, 247, 248, 319, 242/245; 277/165, 177, 178

[56] References Cited

U.S. PATENT DOCUMENTS

| | | | |
|---|---|---|---|
| 2,884,211 | 4/1959 | Holohan, Jr. | 242/319 |
| 3,586,289 | 6/1971 | Priese | 277/165 X |
| 4,416,428 | 11/1983 | Noda | 242/241 |
| 4,496,161 | 1/1985 | Fischer | 277/165 X |
| 4,702,432 | 10/1987 | Kaneko et al. | 242/246 |
| 4,742,974 | 5/1988 | Furomoto | 242/319 X |
| 4,907,759 | 3/1990 | Takeuchi et al. | 242/246 |
| 4,911,378 | 3/1990 | Hitomi | 242/246 |
| 5,042,741 | 8/1991 | Aota | 242/247 X |

FOREIGN PATENT DOCUMENTS

| | | |
|---|---|---|
| 63-68773 | 5/1988 | Japan .................. 242/246 |
| 614837 | 8/1946 | United Kingdom . |
| 1009945 | 9/1963 | United Kingdom . |
| 2019182A | 4/1979 | United Kingdom . |

Primary Examiner—Daniel P. Stodola
Assistant Examiner—Michael R. Mansen
Attorney, Agent, or Firm—Dickstein, Shapiro & Morin

[57] ABSTRACT

A drag mechanism of a spinning reel includes friction discs disposed at a forward position of a spool for applying a braking force to relative rotation between the spool and a spool shaft, an adjuster member attached to a front end of the spool shaft for adjustment of a pressing force to be applied to the friction discs, a case member including a bottom wall having a hole for inserting the spool shaft and a cylindrical side wall. The case member is disposed at a space formed inside the spool at a position adjacent the spool shaft inside a line-takeup face of the spool. The friction discs are positioned inside the case member. A closing structure is disposed at an opening of the case member for applying a pressing force to the friction discs while maintaining a sealed condition relative to the opening of the case member.

3 Claims, 2 Drawing Sheets

SPINNING REEL HAVING A SEALED FRONT DRAG MECHANISM This application is a continuation, of application Ser. No. 07/726,795 filed Jul. 8, 1991, now abandoned.

BACKGROUND OF THE INVENTION

1. Field of the Invention

The present invention relates to a drag mechanism of a spinning reel, and more particularly to a drag mechanism of the above type including friction discs disposed at a forward position of a spool of the reel for applying a frictional braking force against relative rotation between the spool and a spool shaft and an adjuster member screw-engaged with a front end of the spool shaft for adjusting a pressing force to be applied to the friction discs.

2. Description of the Related Art

A conventional drag mechanism of a spinning reel of the above-described type is known from e.g. a Japanese laid-open utility model gazette No. 63-68773. In this mechanism, the friction discs are bound between the spool and a metal plate; and the adjustment of the braking force of the drag mechanism is effected through a variation in the pressing force applied against the metal plate. Further, intrusion of foreign substance such as water is prevented through contact between a front face of the spool and an elastic seal having a rib fitted about an outer periphery of the metal plate.

The above-described conventional reel uses an elastic seal having a relatively large diameter; and therefore, the contacting length between the seal rib and the front face of the spool tends to be long as well. For this reason, compared with a construction using an elastic seal of a smaller diameter, the above construction is disadvantageous and is vulnerable to intrusion of water and also for a rotational speed, i.e. peripheral velocity of the spool being relatively high at its rib-contacting portion. Moreover, because of the large relative rotation amount, it is difficult to set the braking force of the drag mechanism at a small value without sacrificing the effect of the braking force.

On the other hand, with the above-described conventional reel, the friction discs are placed into direct contact with the front face of the spool. Therefore, it is difficult also to obtain e.g. a large braking force, because this requires a member having a greater friction coefficient to be affixed to the front face of the spool. In short, it is difficult for the conventional construction to obtain an appropriate amount of braking force.

The primary object of the present invention is to provide an improved drag mechanism of a spinning reel through rational construction of the mechanism, the improvement enabling the mechanism to constantly provide an appropriate amount of braking force even after an extended period of time without any deterioration of sealing effect.

SUMMARY OF THE INVENTION

For accomplishing the above-noted object, a drag mechanism of a spinning reel, according to the present invention, comprises:

a friction disc means disposed at a forward position of a spool, the disc means applying a braking force to relative rotation between the spool and a spool shaft;

an adjuster member attached to a front end of the spool shaft for adjustment of a pressing force to be applied to the friction disc means;

a case member including a bottom wall having a hole for inserting the spool shaft and a cylindrical side wall, said case member being disposed at a space formed inside the spool at a position adjacent said spool shaft inside a line-takeup face of said spool through a torque transmission mechanism so that the case member is rotated together with the spool;

said friction disc means being positioned inside said case member; and a closing means disposed at an opening of said case member for applying a pressing force to said friction disc means while maintaining a sealed condition relative to said opening of said case member.

Functions and effects of the above-described construction will be described next.

This construction can be embodied as shown in FIGS. 1 and 2, for instance. With this construction, the friction disc means 8 is disposed inside the case member 7 with the disc means 8 being sealed by the closing means 10, whereby the construction is well sealed against the intrusion of substances (e.g. water, dust etc.). Moreover, as also shown in FIGS. 1 and 2, although the seal 9 is interposed between the opening 7A of the case member 7 and the closing means 10 like the aforementioned conventional reel this seal 9 has a shorter peripheral length than that used in the conventional reel. Accordingly, the invention's construction is more effective for preventing deterioration in the sealing effect of the seal 9 and generation of inadvertently large braking force due to contact with the seal 9. Further, adjustment of this braking force is readily possible through operation of the adjuster member 11.

Moreover, in the case of this construction using the case member 7, it is possible to form, the case member 7 of any material having a desired friction coefficient.

As a result, the invention has fully achieved its intended object of providing an improved drag mechanism of a spinning reel through rational construction of the mechanism, the improvement enabling the mechanism to constantly provide an appropriate amount of braking force even after use of an extended period of time without any deterioration of sealing effect.

Further and other objects, features and effects of the invention will become more apparent from the following more detailed description of the embodiments of the invention taken with reference to the accompanying drawings.

BRIEF DESCRIPTION OF THE DRAWINGS

Accompanying drawings illustrate preferred embodiments of a drag mechanism of a spinning reel relating to the present invention; in which.

DESCRIPTION OF THE PREFERRED EMBODIMENTS

Preferred embodiments of a drag mechanism of a spinning reel, relating to the present invention, will now be described in detail with reference to the accompanying drawings.

Figure 4:
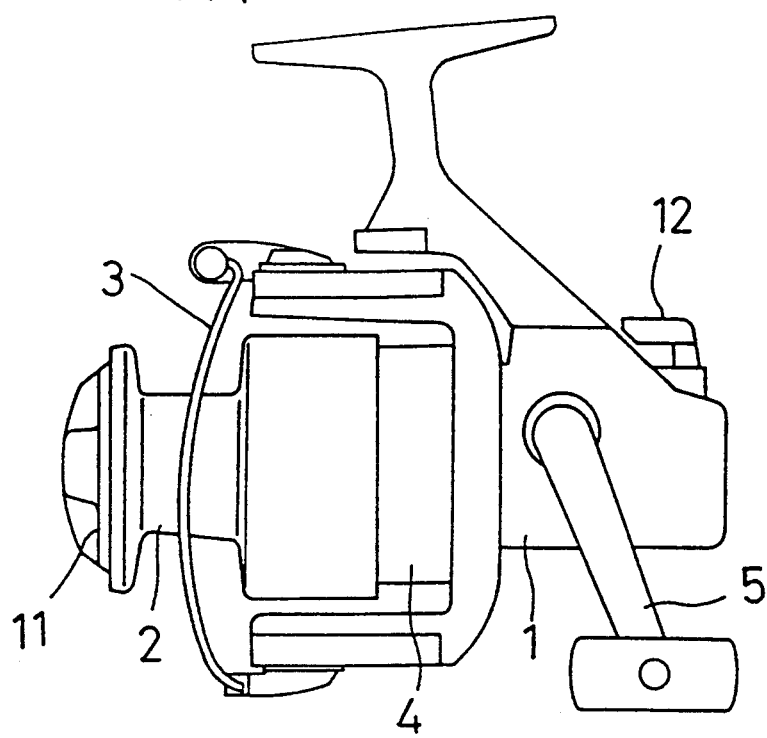
FIG. 4 is an overall side view of the spinning reel.

As shown in FIG. 4, a spinning reel includes a spool 2 disposed at a forward position of a reel body 1, rotor 4 having a bail 3 and a handle 5 attached to a lateral side of the reel body 1 for rotating the rotor 4.

Figure 1:
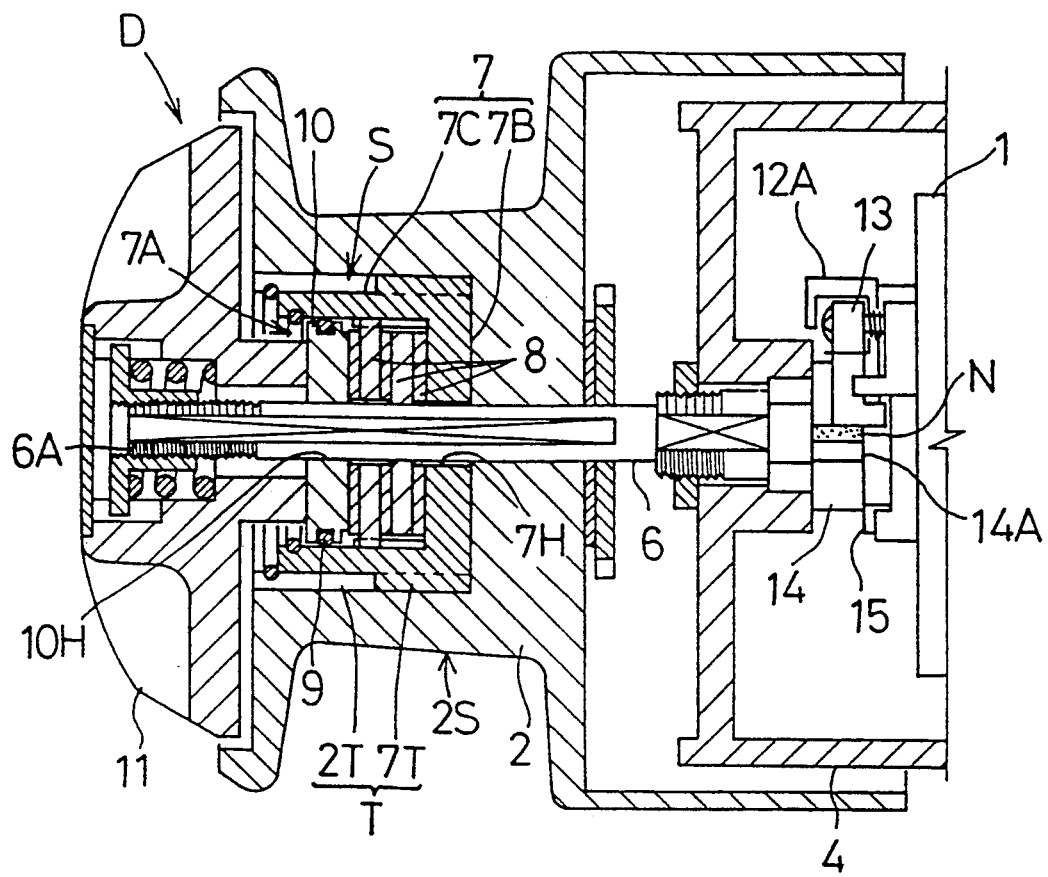
FIG. 1 is a section view of a drag mechanism according to one preferred embodiment of the present invention.
Figure 2:
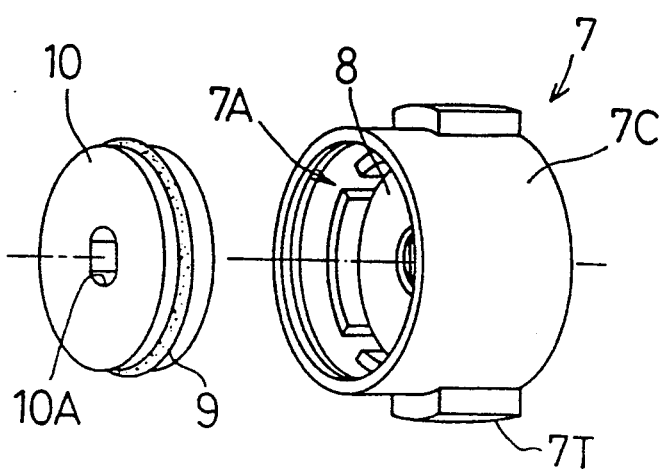
FIG. 2 is a perspective view showing configurations of a case member and its associated components.

Further, as shown in FIGS. 1 and 2, this spinning reel includes a drag mechanism D for supporting the spool 2 rotatably relative to a spool shaft 6 longitudinally reciprocatable in association with a rotary operation of the handle 1 and also for applying a braking force to rotation of the spool 2.

More particularly, the spool 2 has an inner space S formed adjacent the spool shaft 6 inside a line-takeup face 2S of this spool 2. The inner space S is open towards the forward terminal end of the spool 2 and the spool shaft 6 extends through this space S. The inner space S accommodates therein a case member 7 which is rotatable together with the spool 2 through a torque transmission mechanism T. And, the case member 7 accommodates therein a plurality of friction discs 8 . . . . Further, at an opening portion 7A of this case member 7, there is provided a closing disc 10 (an example of a closing means) having a seal 9 for maintaining a sealed condition. Also, at a threaded portion 6A of the spool shaft 6, there is provided an adjuster member 11 for applying a pressing force to the friction discs 8 through the closing disc 10.

The above-described case member 7 includes a bottom wall 7B having a hole portion 7H through which the spool shaft 6 extends and a cylindrical side wall 7C. The closing disc 10 defines a non-circular hole portion 10A engageable with the spool shaft 6 to be rotated therewith. The torque transmission mechanism T includes groove portions 2T, 2T defined in lateral walls of the inner space S of the spool 2 and engaging pieces 7T, 7T formed on the case member 7 to be fitted into the groove portions 2T, 2T.

With this drag mechanism D, as the adjuster member 11 is rotated, the friction discs 8 are bound with an appropriate pressure between the bottom wall 7B of the case member 7 and the closing disc 10.

Figure 3:
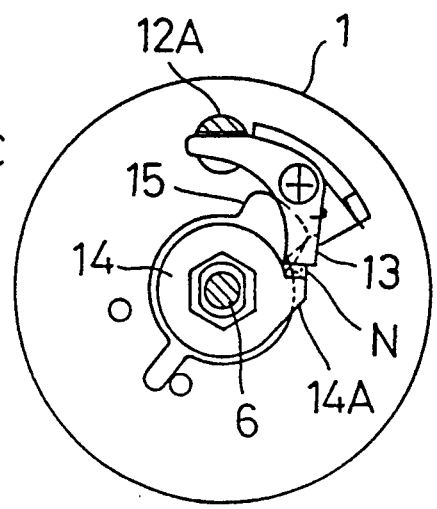
FIG. 3 is a front view showing a stopper disc and other components.

The spinning reel, as shown in FIG. 3, is switchable between a state where reverse rotation of the rotor 4 (i.e. the direction for feeding a fishing line) is prevented and a further state where this reverse rotor rotation is allowed. And, the drag mechanism D is operable only in the former-mentioned state.

The construction shown in FIG. 3 includes a stopper arm 13 operable via an operating shaft 12A with an operation of a lever 12 attached to the reel body 1, a stopper disc 14 rotatable with the rotor 4, a silent cam 15 receiving rotational force from the rotor 4 through a friction transmitting mechanism and a shock-absorbing unit N comprised of e.g. a rubber element, a spring or the like formed on an abutment element 14A of the stopper disc 14. During the reverse-rotation-preventing state, the stopper arm 13 comes into abutment against the abutment piece 14A through the shock-absorbing unit N. On the other hand, the reverse-rotation-allowing state, the stopper arm 13 is displaced by the silent cam 15 to a position not to abut the abutment piece 14.

Figure 5:
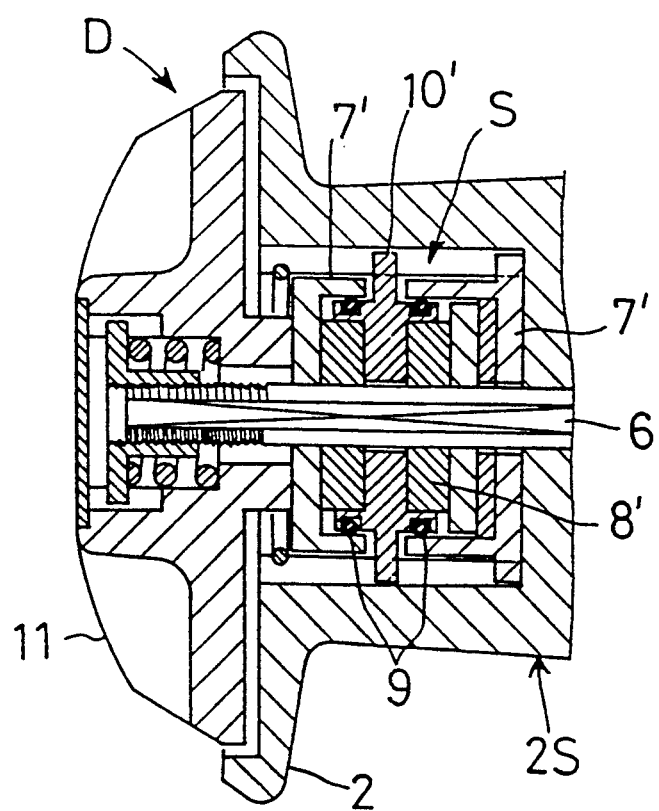
FIG. 5 is a section view showing a drag mechanism relating to a further embodiment of the invention.

In place of the foregoing embodiment, the present invention can be embodied also as shown in FIG. 5. In this alternate construction, a pair of the case members 7', 7' are opposed to each other across the closing disc (in FIG. 5, the same components as those employed in the foregoing embodiments are denoted with the same reference marks; a prime ' is used to show structures which are similar to but slightly altered from like structures in FIG. 1).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embranced therein.

What is claimed is:

1. A drag mechanism of a spinning reel comprising:
   a spool rotatably mounted on a spool shaft, a hollowed spool portion being defined on one side of said spool;
   a cylindrical member substantially housed in said hollowed spool portion, said cylindrical member being rotatable coaxially and integrally with said spool, said cylindrical member having a chamber comprising an interior side wall substantially parallel to said axis of said spool shaft and a bottom wall normal to said axis;
   friction means, in contact with said bottom wall, for applying a braking force to relative rotation between said spool and said spool shaft, said friction means being axially movably supported on said spool shaft;
   a closing disc for closing said chamber, said closing disc being in contact with said friction means and being axially movably supported on said spool shaft, said closing disc having a first seal member in contact with said interior side wall;
   an adjuster member provided on an end portion of said spool shaft, said adjuster member adjusting a pressure force of said closing disc and said friction means against said bottom wall of said cylindrical member by being axially displaced with respect to said spool shaft.

2. A drag mechanism of a spinning reel as in claim 1, wherein said cylindrical member comprises a forward cylindrical portion and a rearward cylindrical portion, and wherein said first seal member contacts an interior side wall of said forward cylindrical portion and wherein said closing disc includes a second seal member which contacts with an interior side wall of said rearward cylindrical portion.

3. A drag mechanism of a spinning reel as in claim 1, wherein said seal member is an annular seal mounted on an exterior circumferential surface of said closing disc.

* * * * *